Sept. 17, 1940.                    C. F. DINLEY                    2,214,788
                       DEGREASING APPARATUS AND THE LIKE
                         Filed Aug. 6, 1937        6 Sheets-Sheet 1
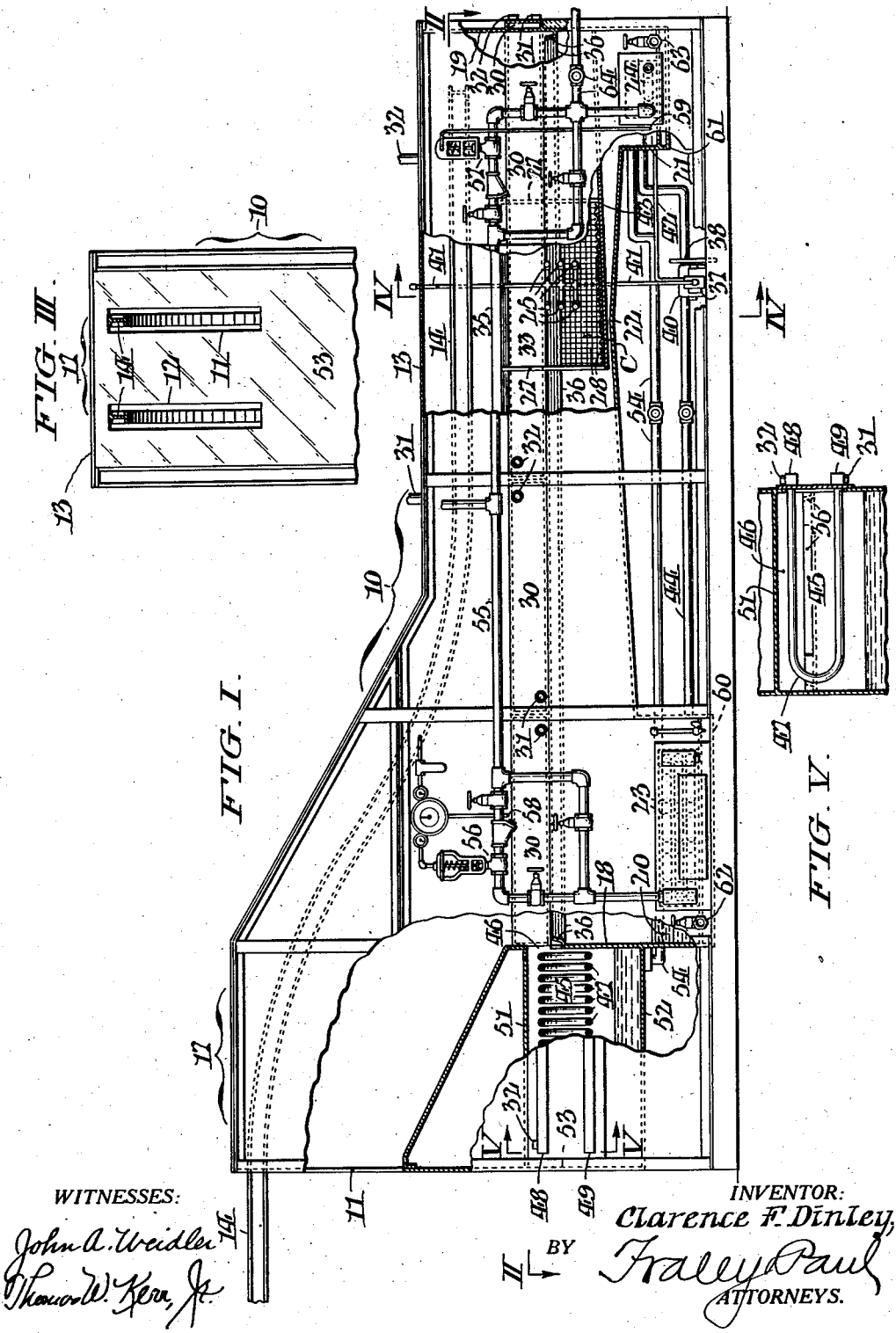
WITNESSES:                                              INVENTOR:
                                                   Clarence F. Dinley,
                                               BY
                                                           ATTORNEYS.

Sept. 17, 1940.  C. F. DINLEY  2,214,788
DEGREASING APPARATUS AND THE LIKE
Filed Aug. 6, 1937  6 Sheets-Sheet 2
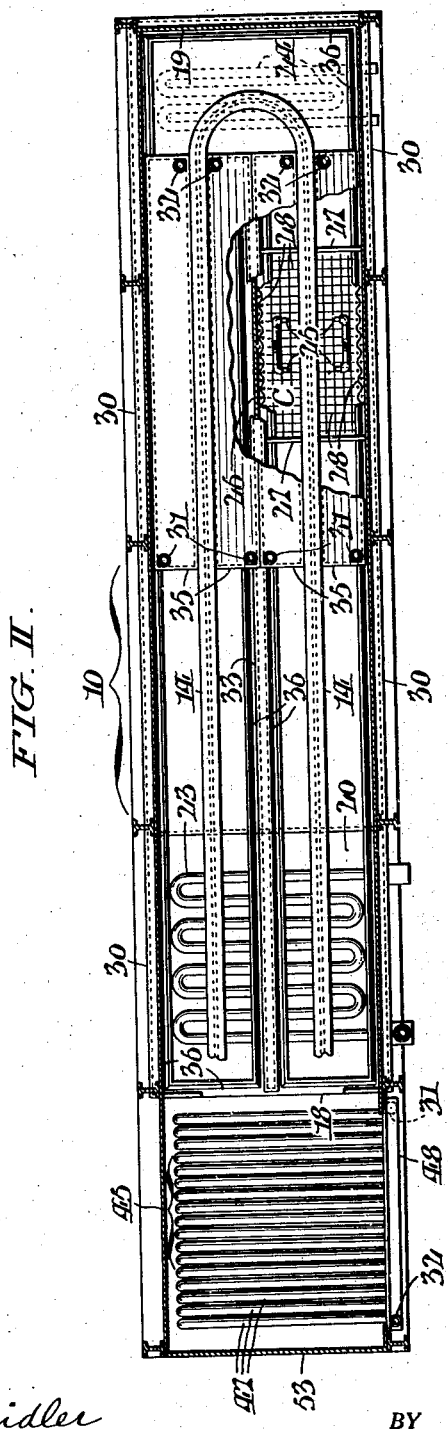
FIG. II.
WITNESSES:
John A. Weidler
Thomas W. Kerr, Jr.
INVENTOR:
Clarence F. Dinley,
BY
ATTORNEYS.

Sept. 17, 1940.   C. F. DINLEY   2,214,788
DEGREASING APPARATUS AND THE LIKE
Filed Aug. 6, 1937   6 Sheets-Sheet 3
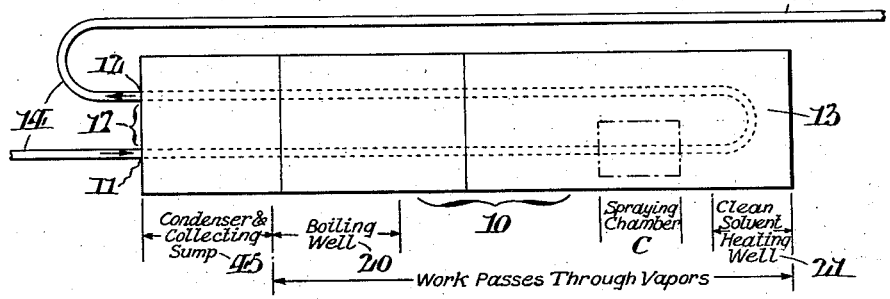
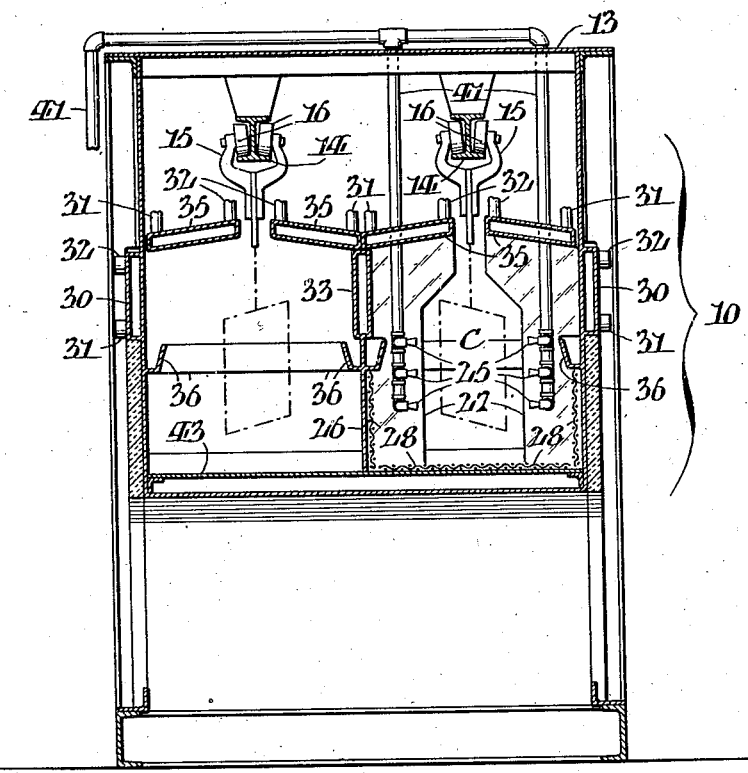
WITNESSES:
John A. Weidler
Thomas W. Kerr, Jr.
INVENTOR:
Clarence F. Dinley,
BY Frailey & Paul
ATTORNEYS.

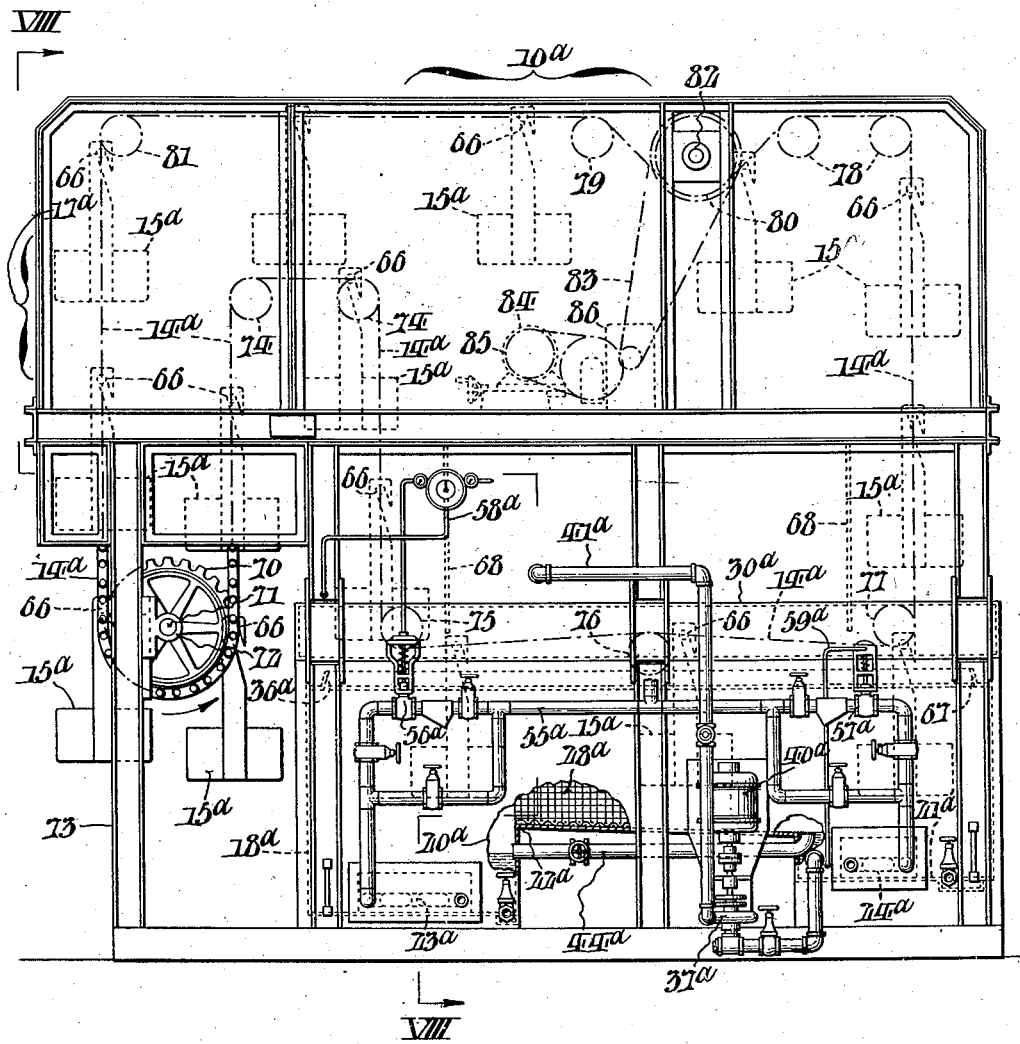

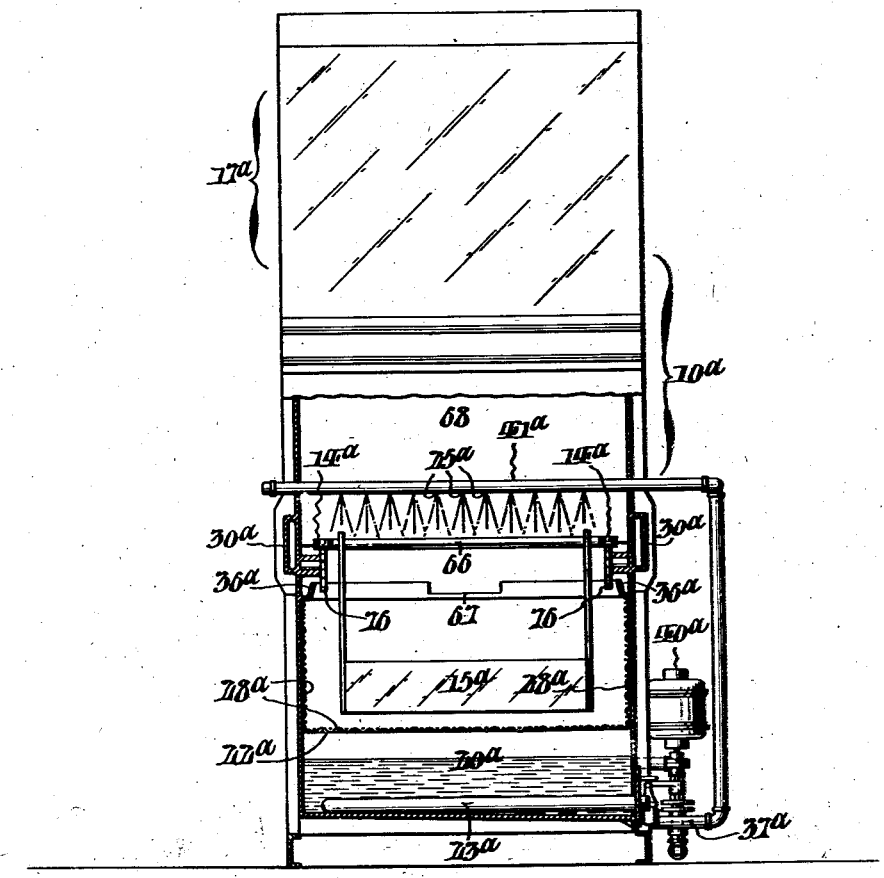

Sept. 17, 1940.  C. F. DINLEY  2,214,788
DEGREASING APPARATUS AND THE LIKE
Filed Aug. 6, 1937  6 Sheets-Sheet 6
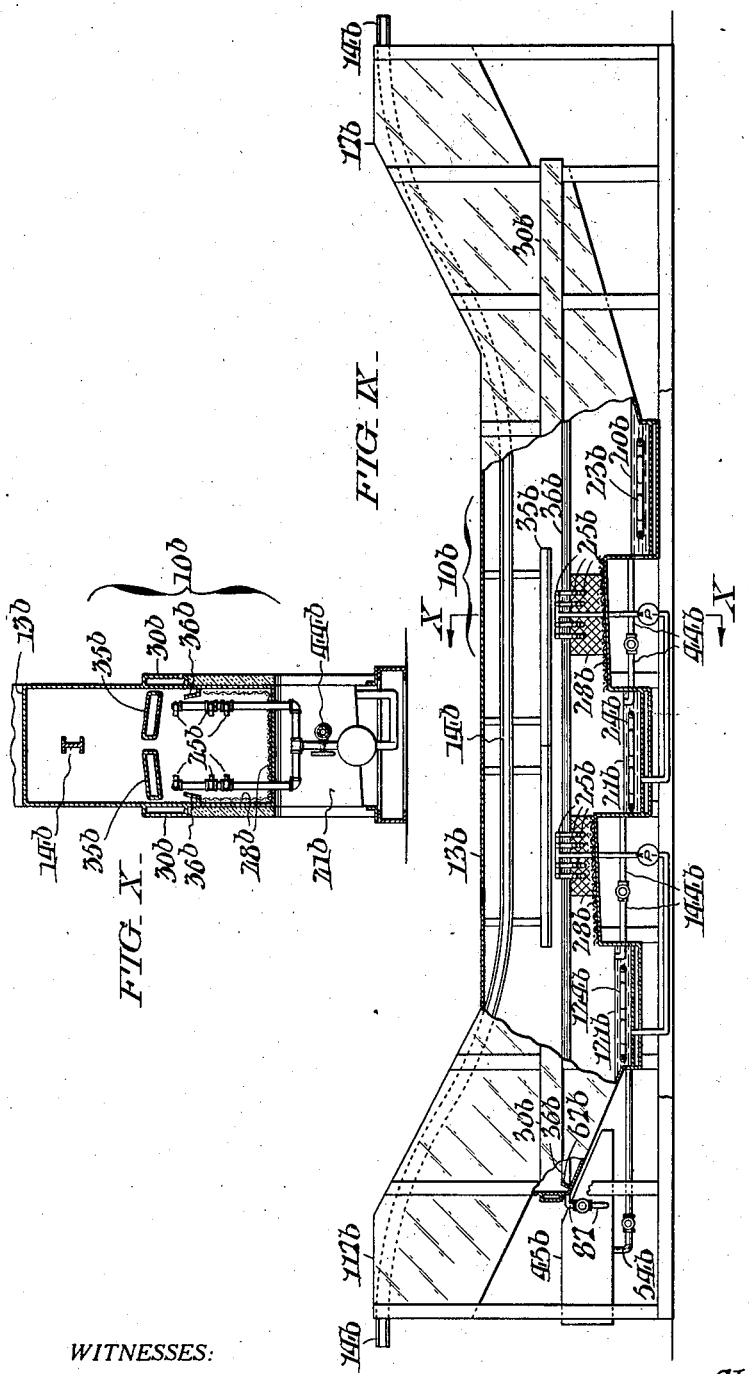
WITNESSES:
John A. Weidler
Thomas W. Kerr, Jr.
INVENTOR:
Clarence F. Dinley,
BY Fraley Paul
ATTORNEYS.

Patented Sept. 17, 1940

2,214,788

UNITED STATES PATENT OFFICE 2,214,788

DEGREASING APPARATUS AND THE LIKE

Clarence F. Dinley, Detroit, Mich., assignor, by mesne assignments, to Solvent Machine Company, Detroit, Mich., a corporation of Michigan, as trustee Application August 6, 1937, Serial No. 157,675

5 Claims. (Cl. 202—170)

My invention relates to treatment with solvents for such purposes as cleaning and degreasing, and to the use of volatile solvents. Various solvents whose vapors are heavier than air may be used, such as benzine, benzol, and chlorinated solvents like carbon tetrachloride, trichloromethane, tetrachloromethane, dichlorethane, tetrachlorethane, trichlorethylene, and tetrachlorethylene, whose vapors are uninflammable. The articles or work to be cleaned may be treated with the liquid solvent or with the solvent vapor, or both; and in many cases, treatment with hot or even boiling liquid solvent is desirable. I aim at economizing solvent and preventing or minimizing loss of its vapor from the treating vessel, even with the latter more or less open for the introduction and removal of work. My invention is especially adaptable and advantageous in cases where comparatively large quantities of work are treated, and large amounts of solvent are used, and particularly when the work is sprayed with the hot solvent, so that large quantities of solvent vapor tend to evolve. In suitable forms of embodiment, such as hereinafter described, my invention affords a compact and efficient machine, wherein metal parts or objects or work can be rapidly, thoroughly, and economically cleaned of oil, grease, and dirt.

In certain forms of embodiment of the invention, hereinafter described, I minimize loss of solvent vapor by employing a treating vessel open or apertured at its upper portion, at or near one end, for the introduction and withdrawal of work, but otherwise substantially closed, so as to exclude air, retain solvent vapor, and prevent drafts into and out of the vessel, and by condensing the vapor at a level or zone substantially below the work opening(s) above referred to, so as to limit the vapor to the lower portion of the vessel, below such level. Provision may be made for mechanically passing work into, through, and out of the vessel via the work opening(s) in a definite or fixed course, by conveyor means traveling above the vapor level,—although this is not essential. Without interfering with the free travel of the work, eddies or currents in the vapor evolved in the vessel may be excluded from the vicinity of the work opening. Even very dirty work can be treated with very pure solvent over long periods without cleaning out the apparatus.

An important aim of my invention is to obviate or minimize splashing of liquid solvent when sprayed, and consequent liberation of solvent vapor. For this purpose, I screen any desired wall(s) in the path of the sprayed solvent with a foraminous grillage, suitably interposed. This deadens the impact of the liquid against the wall, and minimizes splashing and ricochet of the liquid; in other words, it absorbs the kinetic energy of the liquid and "kills" the spray, so that the liquid simply runs or drips away quietly.

Various other features and advantages of the invention will appear from the description hereinafter of species or forms of embodiment thereof, and from the drawings. All the features and combinations shown or described are, indeed, of my invention, so far as novel over the prior art.

In the drawings, Fig. I is a side view of one form of apparatus suitable for the purposes of my invention, the main enclosure or treating vessel shown being partly in vertical section.

Fig. II is a corresponding plan view in horizontal section as indicated by the line and arrows II—II in Fig. I; and Fig. III is a fragmentary end view from the left of Fig. I.

Fig. IV shows a cross section through the apparatus, taken as indicated by the line and arrows IV—IV in Fig. I, on a larger scale.

Fig. V is a fragmentary cross sectional view, taken as indicated by the line and arrows V—V in Fig. I.

Fig. VI is a diagram of the apparatus, in plan.

Fig. VII is a side view of another form of apparatus.

Fig. VIII is an end view with the apparatus partly in transverse section, taken as indicated by the line and arrows VIII—VIII in Fig. VII.

Fig. IX is a side view of yet another form of apparatus, partly in vertical longitudinal section.

Fig. X shows a cross section through the apparatus, taken as indicated by the line and arrows X—X in Fig. IX.

The apparatus shown in Figs. I—V comprises a sheet metal treating vessel or enclosure 10 that contains the solvent, whether used as liquid or as vapor, and is closed to exclude air and retain any solvent vapor that may be present—purposely or incidentally—but is open or apertured at its upper portion for the introduction and removal of work. In the particular apparatus shown in Figs. I, II, and III, work is introduced and removed through adjacent openings 11 and 12 at one side or end of the enclosure 10, in its (left-hand) side or end wall, and its top wall or roof 13 is unapertured. For passing the work in and out of or through the enclosure 10 for treatment, there may, if desired, be a conveyor system 14, indicated as of the general overhead trolley type disclosed in my Patent No. 1,942,355, including a monorail track of I-section extending in a U- course through the upper portion of the enclosure 10. Each work-supporting trolley hanger 15 has rollers 16 that run on the lower I-flanges: see Fig. IV. As shown in Fig. I, the enclosure 10 includes a hood portion 17 overhanging beyond the lower main portion at its left-hand end wall 18, and raised above the rest of the roof, and closed except at the work openings 11, 12 in its end wall. The conveyor system or track 14 extends in side by side runs, from the entrance opening 11 downward through the hood 17 beneath the roof 13 nearly to the right-hand end wall 19 of the enclosure, and back again and upward through the hood to the exit opening 12.

In general, work is treated with liquid or vaporous solvent (or both) in the lower portion of the enclosure 10, while its upper portion serves mainly to prevent or minimize loss of solvent vapor from the enclosure, especially in drying the work after treatment with the solvent. For when the solvent employed is highly volatile light gasoline or benzine; or when the work is immersed in the solvent while itself still hot or warm; or when the solvent is used hot or even boiled during use; or when the solvent is purposely used in the vapor state; or when the work is allowed to drain or dry in the upper portion of the vessel after treatment with the solvent; in all such cases, solvent vapor will be present, and will tend to accumulate to the point of overflowing at the openings 11, 12. When the solvent is to be used hot—whether as liquid or as vapor—it may be heated (and vaporized) in the lower portion of the enclosure, by any suitable heating means. As shown in Fig. I, the enclosure 10 has a plurality of solvent wells 20, 21 separated by an elevated portion of the sheet metal bottom of the enclosure, which slopes in opposite directions toward the wells from an intermediate crest 22. As here shown, both the wells 20, 21 are provided with heating means, such as (removable) steam pipes 23, 24 near the bottoms, for heating, vaporizing, or even boiling the liquid solvent in said wells. In general, however, the solvent is boiled and vaporized primarily in the well 20, and the well 21 is supplied with pure clean solvent by condensing the vapor evolving from said well 20.

The lower main portion of the enclosure 10 being filled with solvent vapor evolving from the wells 20, 21 (at least to a level somewhat below the conveyor system 14), the work carried through the enclosure by the conveyor will be cleaned by pure liquid solvent condensing directly on the work, by virtue of the fact that the entering work is ordinarily cooler than the boiling point of the solvent. As shown in Figs. I, II, and IV, however, provision is made for forcibly spraying the work with liquid solvent, to wash off any dirt adhering to it, including even solid particles, or other dirt insoluble in the solvent. For this purpose, spray pipes with nozzles 25 are shown in Figs. I, II, and IV, arranged adjacent the path of travel of the work. These sprays 25 are at the inner end of the enclosure 10 (speaking with reference to the work openings 11, 12), so that solvent condensed on the entering work may have a chance to soften and loosen the greasy dirt before the work enters the sprays. In the present instance, the sprays 25 are associated with the inward run of the conveyor 14, and direct substantially horizontal jets of liquid solvent on the passing work from opposite sides. An upright central sheet metal partition or septum 26 (Fig. IV) may be interposed between the inward and outward paths or runs of the work at the sprays 25, so that work sprayed and washed during its inward travel shall have substantially its entire outward run to drain and dry off, before leaving the enclosure 10 at 12. The extent of the septum 26 along the path of travel of the work marks a sort of "spraying chamber" C, which is further defined by the side wall of the enclosure 10, and by other parts hereinafter mentioned, including transverse partitions or baffles 27, 27 at the ends of the septum 26, which limit the splash or ricochet of the spray when it strikes the work.

As shown in Figs. I, II and IV, the work while being sprayed by the nozzle 25 is surrounded by a grillage 28, preferably secured as a lining to walls of the spray chamber C. This deadens the impact of the liquid against the walls, minimizes splashing and ricochet of the liquid, and reduces the liberation of solvent vapor at the sprays. Any form of screening or grillage 28 can be used, such as expanded metal or wire mesh. Wire mesh of $\frac{1}{16}$ inch galvanized iron wire with six meshes per lineal inch is satisfactory, and it may be fastened directly against the side and bottom walls of the spray chamber C, without any interposed spacers. Jets of liquid striking the screened walls are stopped dead, without rebound or ricochet; the liquid loses its momentum and simply runs or drips away on or in the screening 28.

The escape of solvent from the enclosure 10 is prevented not only by the closure of its top at 13, but also by both introducing and withdrawing the work at the same end or side of the enclosure, and at substantially or approximately the same point (as represented by the work openings 11, 12), so that there can be no drafts of air across or through the top of the enclosure 10, to cause eddies in the latter and thus draw or force out the solvent vapor. Loss of solvent vapor can be further prevented or minimized by condensing the solvent vapor from or at a level substantially below the openings 11, 12, and thereby limiting the accumulation of vapor in the enclosure to its lower portion, below such level. Thus any vapor entering or arising in the draft-free upper portion of the enclosure 10 will (being heavier than air) naturally gravitate into the lower portion of the enclosure, without danger of escaping through the openings 11, 12; and this upper portion of the enclosure can be utilized to finally dry the work after it has been treated with solvent. While the external atmospheric cooling of the upper portions of the vessel or enclosure walls will condense vapor in it, yet generally it is preferable to supplement or (largely) replace atmospheric cooling with more effective cooling means, so that the enclosure 10 need not be so deep as mere atmospheric cooling would require. The particular type and arrangement of cooling means—whether internal or external, and whether on one side, two or more sides, or all around the enclosure 10—is broadly immaterial; but the greater the extent of the cooling means perimetrically of the enclosure, the less its extent vertically need be to give adequate exposed cooling area. The solvent vapor, being heavier than air, will always flow by gravity toward the region or area where it is most rapidly cooled and condensed—just as if there were an actual outlet for the vapor at such region.

As shown in Figs. I, II, and IV, the main portion of the enclosure 10 is (externally) water-jacketed on both side walls and across its end wall 19, all of which are equipped with condensing jacket sections 30. Each of the sections 30 has an inlet 31 at its lower corner at one end, and an outlet 32 at its upper corner at the other end, for water or other cooling medium. There is also a central longitudinal condensing water-wall section 33, with inlet 31 and outlet 32, extending through the main lower portion of the enclosure 10 at the same level as the jacketing 30, from the end wall 18 nearly to the end wall 19, Fig. II. In addition, there are "overhead" water-wall sections 35, each with inlet 31 and outlet 32, in the inner end of the enclosure 10, over the sprays 25. These condensing sections 35 are shown arranged in pairs over the path of the work suspended from the conveyor 14, at opposite sides of the central water-wall 33, and extend some distance each way beyond the spray chamber C. As shown in Fig. IV, the sections 35 of each pair slope inward and upward from the tops of corresponding jacket sections 30 and 33, with a gap between them for the work hangers 15.

The pure liquid solvent condensed by the cooling jackets or walls 30, 33, 35 runs down into intercommunicating troughs 36 that extend along the side and end walls of the main lower portion of the enclosure 10, and along beneath the lower corners of the water-wall 33. From these troughs 36, the pure condensate ordinarily drains into the well 21 in any suitable way. Thus this well 21 is continually supplied with very pure liquid solvent, which may be heated by the heating pipes 24 as already mentioned. Preferably it is this pure solvent from well 21 that is supplied under pressure to the nozzles 25 to spray the work. For this purpose, there is shown a (rotary centrifugal) pump 37 driven through suitable belting 38 by an (electric) motor 40. The delivery pipe 41 from the pump 37 is connected to the spray nozzle 25, and its suction pipe 42 draws from the well 21 near its bottom.

In order to avoid contaminating the pure solvent in well 21 with oil, grease, or dirt washed from the work by the sprays 25, the sprayed solvent is preferably excluded from this well 21, and drained away or returned into the well 20. For this purpose, a sheet metal drain pan or false bottom 43 is shown in Figs. I and IV as extending on a downward slope from the right-hand end wall 19 under the sprays 25 to the left-hand boundary of the spray chamber C, beyond the crest at 22. Draining from the lower end of this pan 43, the sprayed solvent runs back along the enclosure bottom into the well 20, where it is heated, boiled, and vaporized again. Any surplus solvent from the well 21 may overflow over the crest at 22, under the pan 43, and run back into the well 20; or it may run back through a valved return pipe 44. As the space under the pan 43 also allows escape of any solvent vapor evolving in the well 21, it is unnecessary to space the edges of the pan from the enclosure walls for this purpose: on the contrary, it may abut and be secured to them, as shown in Fig. IV.

While the cooling and condensing surface afforded by the water jacket 30 and water walls 33 and 35 may suffice in many cases, I prefer to provide additional cooling and condensing surface at the work opening end of the enclosure 10. This is also a means of preventing or minimizing currents or eddies in the vapor and air in the main portion of the enclosure 10, due to the heat of the well 20, or to the upward draft or "stack effect" of the hood 17, or to other causes, and of excluding such currents or eddies from the openings 11, 12, and even from the hood. As here shown, in Figs. I, II, and V, the additional cooling surface is not arranged in the main portion of the enclosure 10, or in the hood 17, but comprises a separate condenser 45 in free communication with the main portion of the enclosure below the hood and the openings 11, 12, through an ample opening 46 in the wall 18, extending the full width of the enclosure. This condenser 45 comprises a chamber with a large number of U-tubes 47 therein, connected between inlet and outlet headers 48, 49 having supply and discharge connections 31, 32 at their opposite ends, for water or other cooling fluid. The condensing chamber 45 is bounded by extensions of the main enclosure sides, by top and bottom walls 51, 52, by the wall 18 below the opening 46, and by an upright wall 53 directly opposite the wall 18,—in line with the left-hand wall of the hood 17 containing the openings 11, 12. The condenser 45 draws and condenses solvent vapor from the enclosure 10 below the hood 17 and its openings 11, 12, between the same and the (heating) wells 20, 21 and sprays 25, and the pure condensate accumulates in a sump in the bottom of the chamber 45. As shown in Figs. I, II, and V, the trough 36 at the enclosure wall 18 has practically no inner side, so that condensed liquid solvent from the whole trough system 36 runs through the opening 46 into the sump in chamber 45. Thence the pure condensate ordinarily runs off into well 21 through a valved pipe 54.

As shown in Fig. I, steam is supplied to the heaters 23, 24 in the wells 20, 21 through valved piping 55 provided with thermostatically controlled stop valves 56, 57 whose temperature-responsive devices 58, 59 are exposed in the enclosure 10, above the well 20 and the condenser jacket 30, and near the bottom of the well 21, respectively. The bottoms of the wells 20 and 21 are shown equipped with steam jackets 60 and 61, which may be supplied with steam for the purpose of boiling away and distilling all the solvent into the chamber 45 when it is desired to clean out the wells 20 and 21. These wells are also provided with draw-off valves 62, 63. There is also shown a valved connection 64 to the piping 55 associated with the heater 24, for supplying water or other cooling medium to the heater 24 to cool the solvent in well 21 instead of heating it, if desired.

A mode of operation of the apparatus is as follows:

As suggested in Fig. VI, the conveyor system 14 may be part of the general conveyor system of a plant, describing at my apparatus an S (as seen in plan) whose lower portion forms the U in the enclosure 10. Work entering at opening 11 descends through the hood 17 above the condenser and sump 45, and is thereafter immersed in the solvent vapor until it reascends through the hood on its return to opening 12. In its travel to the right, the grease and dirt on the work are first loosened by solvent condensing on it, and then washed off in the sprays at C. On the return of the work to the left, the solvent drains and drys off; so that it emerges at 12 clean and dry. The downdraft influence of condenser 45 insures that any vapor forming in the hood 17 shall sink down into the main portion of enclosure 10, so that the loss of solvent in operation is very small.

When accumulation of dirt in the apparatus (and especially in well 20) makes cleaning desirable, the valve in pipe 54 is closed, and steam is supplied to the bottom jackets 60, 61 as well as to the heaters 23, 24 to boil the solvent in the wells 20, 21, thus distilling it all into the sump in chamber 45. The piping 55, it will be observed, has valved by-passes around the valves 56, 57 that render the latter ineffective to interfere with this distillation operation. When the distillation has been carried as far as desired, one or both heaters 23, 24 may be removed and cleaned, and one or both wells 20, 21 (and the rest of the apparatus) also cleaned. The apparatus having been restored to operative condition, the valve in pipe 54 is opened, allowing the solvent to drain into well 21 and thence to overflow through pipe 44 in well 20. Ordinary operation may then be resumed.

The apparatus shown in Figs. VII and VIII has a hood 17a overhanging beyond one end 18a of the lower portion of the enclosure 10a, and completely open at its bottom for the entrance and exit of work. The conveyor system 14a is of a double endless chain and sprocket type, with baskets or other work-supports 15a hung on cross-rods 66 interconnecting the chains. There are solvent wells 20a, 21a, with an intervening raised bottom and crest 22a over which solvent may overflow from well 21a to well 20a; or, alternatively, the solvent may flow back from well 21a to well 20a through a valved pipe 44a. Primarily, the solvent is boiled and vaporized in well 20a to fill the main lower portion of the enclosure 10a up to the level of a cooling jacket 30a extending (externally) around the enclosure, and the pure liquid solvent thereby condensed on the enclosure walls drains into a trough 36a extending around the enclosure walls, below the jacket 30a. From the trough 36a, the condensate drains into the well 21a, through a notch 67 in the trough side. From the well 21a, the pure liquid solvent is supplied under pressure to spray nozzle openings or jets 25a in the lower side of a transverse spray pipe 41a extending across the interior of the enclosure 10a, nearly over the bottom crest 22a between the wells 20a, 21a, and above the water jacket 30a. At the spraying position or chamber under the jets 25a, the enclosure walls and bottom have grillage linings 28a. To exclude currents and eddies in the air and solvent vapor in the main lower portion of the enclosure (due to the sprays at 25a, or other causes) from the hood 17a, and to prevent such eddies from creating a general vapor circulation in the apparatus, there are upright transverse baffles 68, 68 across the enclosure above the wells 20a and 21a, extending from about mid-height of the jacket 30a well above the open bottom of the hood 17a. These answer many of the same general purposes as the condenser 45a in Figs. I—VI.

Outside of the enclosure 10a, the chains of conveyor 14a double downward around guide sprockets 70 on a transverse shaft 71 mounted in bearings 72 on uprights 73 forming part of the general machine frame. Ascending into the hood 17a adjacent the wall 18a, the chains pass over guide sprockets 74, 74 at the sides of the enclosure, and down and under guide sprockets 75 about at the level of the water jacket 30a. After a substantially horizontal run the length of the lower main portion of the enclosure 10a, over supporting sprockets 76, the chains turn upward around guide sprockets 77 and ascend to the top of the enclosure, where they return the full length of the enclosure, over supporting sprockets 78, 79 and under intervening drive sprockets 80, to and around guide sprockets 81, whence they descend directly to the sprockets 70 first mentioned. The drive sprockets 80 may be mounted on a transverse shaft 82 extending out through the far side of the enclosure 10a, and driven through a chain and sprocket connection 83 from an electric motor 84, with interposed change speed and reduction gearing 85, 86.

The operation of this apparatus is substantially the same as already described, aside from features of Figs. I—VI which have no counterparts in this apparatus. As a means of dispensing with extended or repetitive description, various parts and features are marked in Figs. VII and VIII with the same reference numerals as in Figs. I—VI, with an added a where such distinction appears desirable.

The apparatus shown in Figs. IX and X resembles that of Figs. I—VI, but has separate entrance and exit hoods 17b, 117b rising above the main roof 13b, at opposite ends of the enclosure 10b. The monorail conveyor system 14b extends in one vertical plane right through the enclosure 10b. Three solvent wells 20b, 21b, 121b are shown, with intervening raised portions of the enclosure bottom sloping to the left, and with heating pipes 23b, 24b, 124b. The solvent is primarily heated and boiled in the well 20b, and the condensate produced by the (external) cooling jacket 30b drains into a trough 36b extending all around the lower portion of the enclosure 10b, whence it drains into well 121b through a notch 67b in the trough wall. From the well 121b, pure solvent drains through a valved pipe 144b into the well 21b, and from this well back into the well 20b through a valved pipe 44b. Over the raised bottom portions or dams between wells, the work is sprayed by nozzles 25b with pure solvent drawn from the wells 21b, 121b. At these spraying positions or chambers, the side and bottom walls of the enclosure 10b are lined with grillage 28b, as in Figs. I—VIII. Suspended upper water walls 35b extending from well 121b to well 20b above the sprays 25b answer substantially the same purposes as those in Figs. I—VI. When the apparatus is to be cleaned out, solvent from trough 36b may be run into a storage tank 45b through a valved pipe 87; it may afterward be returned to well 121b through a valved pipe 54b.

As a means of dispensing with extended or repetitive description, various parts and features are marked in Figs. IX and X with the same reference numerals as in Figs. I—VIII, with an added b where such distinction appears desirable.

Having thus described my invention, I claim:

1. In apparatus for treating objects or work with volatile solvent whose vapor is heavier than air, the combination with a treating vessel or enclosure adapted to contain volatile liquid solvent and its vapor, and apertured and open for the introduction and withdrawal of work into and from its upper portion at one side or end thereof only, but otherwise covered over and substantially closed, heating means for heating and vaporizing liquid solvent in the lower portion of said enclosure, and cooling means for maintaining a condensing zone for the solvent vapor in the enclosure at a level substantially below the work opening; of means for collecting and heating the condensed liquid solvent from said cooling means in the lower portion of said enclosure, and for spraying the work therewith, all in the enclosure to the inside of the aforesaid heating and vaporizing means with respect to the said work opening; and means for collecting the sprayed solvent and returning it to the first-mentioned heating means, while excluding it from the said condensed solvent collecting means.

2. In apparatus for treating objects or work with volatile solvent whose vapor is heavier than air, the combination with a treating vessel or enclosure adapted to contain volatile liquid solvent and its vapor, and apertured and open for the introduction and withdrawal of work into and from its upper portion at one side or end thereof only, but otherwise covered over and substantially closed, heating means for heating and vaporizing liquid solvent in the lower portion of said enclosure, and cooling means for maintaining a condensing zone for the solvent vapor in the enclosure at a level substantially below the work opening; of means for collecting the condensed liquid solvent from said cooling means in the lower portion of said enclosure, and for spraying the work therewith in the enclosure; means for collecting the sprayed solvent and returning it to the aforesaid heating means, while excluding it from the said condensed solvent collecting means; and a condenser for drawing solvent vapor out of the enclosure through an opening in its wall at a point between said work opening and the aforesaid solvent heating and vaporizing means.

3. In apparatus for treating objects or work with volatile solvent whose vapor is heavier than air, the combination with a treating vessel or enclosure adapted to contain volatile liquid solvent and its vapor, and apertured and open for the introduction and withdrawal of work into and from its upper portion at one side or end thereof only, but otherwise covered over and substantially closed, heating means for heating and vaporizing liquid solvent in the lower portion of said enclosure, and cooling means for maintaining a condensing zone for the solvent vapor in the enclosure at a level substantially below the work opening; of means for collecting the condensed liquid solvent from said cooling means in the lower portion of said enclosure, and for spraying the work therewith in the enclosure; means for collecting the sprayed solvent and returning it to the aforesaid heating means, while excluding it from the said condensed solvent collecting means; and a conveyor for the work traveling a course through the upper portion of the enclosure carrying the work from said work opening inward into the interior of the enclosure, through the spray therein, and back to said work opening.

4. In apparatus for treating objects or work with volatile solvent whose vapor is heavier than air, the combination with an elongated treating vessel or enclosure adapted to contain volatile liquid solvent and its vapor and apertured and open for the introduction and withdrawal of work into and from its upper portion at one end thereof only, but otherwise covered over and substantially closed, and cooling means for maintaining a condensing zone for solvent vapor in the enclosure at a level substantially below the work opening above referred to; of a conveyor for the work traveling a course through the upper portion of the enclosure, above the condensing level above referred to, with runs from the work opening to the opposite end of the enclosure and back to the opening; means for spraying the work carried by said conveyor with liquid solvent during its inward run; and an upright longitudinal septum dividing the interior of the enclosure at the spraying means into inward and outward side by side longitudinal passages for the work carried by the conveyor, and excluding the spray from the work during its return travel.

5. In apparatus for treating objects or work with volatile solvent whose vapor is heavier than air, the combination with a treating vessel or enclosure covered over and substantially closed to contain volatile liquid solvent and its vapor, but having at one side or end thereof a hood raised above the rest of the enclosure roof, and open only through and under said hood; of a conveyor for work traveling a course through the upper portion of the enclosure, with runs from the opening of the hood down through the latter, beneath the roof of the enclosure, and back again and upward through the hood to the opening; and a condenser for drawing solvent vapor out of the hooded end of the enclosure through an opening in the enclosure wall below the hood, thus creating a down draft counterbalancing the stack draft due to the hood.

CLARENCE F. DINLEY.